United States Patent
Torbohm (10) Patent No.: US 10,837,424 B2
(45) Date of Patent: Nov. 17, 2020

(54) METHOD FOR OPERATING A WIND TURBINE AND A WIND TURBINE SYSTEM

(71) Applicant: General Electric Company, Schenectady, NY (US)

(72) Inventor: Gert Torbohm, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/531,494

(22) Filed: Aug. 5, 2019

(65) Prior Publication Data

US 2020/0040873 A1    Feb. 6, 2020

(30) Foreign Application Priority Data

Aug. 3, 2018    (EP) .................................... 18187303

(51) Int. Cl.
*F03D 7/02* (2006.01)
*F03D 7/04* (2006.01)

(52) U.S. Cl.
CPC ........... *F03D 7/0224* (2013.01); *F03D 7/028* (2013.01); *F03D 7/042* (2013.01);
(Continued)

(58) Field of Classification Search
CPC ........ F03D 7/0224; F03D 7/028; F03D 7/042; F05B 2260/821; F05B 2270/1033; F05B 2270/20; F05B 2270/32; F05B 2270/328
(Continued)

(56) References Cited

U.S. PATENT DOCUMENTS

| 6,713,891 | B2 * | 3/2004 | Kirkegaard | .............. H02G 7/00 |
| | | | | 290/44 |
| 7,982,330 | B1 * | 7/2011 | Ueno | ...................... F03D 13/20 |
| | | | | 290/55 |

(Continued)

FOREIGN PATENT DOCUMENTS

| EP | 3 211 222 A1 | 8/1917 |
| EP | 2 902 623 A1 | 8/2015 |

OTHER PUBLICATIONS

EP Search Report, Feb. 11, 2019.
(Continued)

*Primary Examiner* — Pedro J Cuevas
(74) *Attorney, Agent, or Firm* — Dority & Manning, P.A.

(57) ABSTRACT

A method for operating a wind turbine for generating electrical energy is provided comprising the steps as described below. The wind turbine comprises a nacelle being rotatably supported on a tower of the wind turbine, in particular wherein at least one tower cable is provided in the tower for electrically connecting the nacelle and/or components thereof to e.g. an electrical installation on a ground of the tower. In one step of the method an early untwist operation for untwisting the tower cables of the wind turbine is initiated at a first specific time. In addition, a future power generation of the wind turbine is predicted for a certain prediction period at least by analyzing a prediction of the wind, in particular by analyzing at least wind direction forecast information and/or wind speed forecast information. The first specific time for initiating the early untwist operation is determined such that an overall predicted energy generation of the wind turbine over the certain prediction period is maximized or that a predicted energy loss caused by an untwist operation is minimized.

14 Claims, 5 Drawing Sheets

(52) U.S. Cl.
CPC . *F05B 2260/821* (2013.01); *F05B 2270/1033* (2013.01); *F05B 2270/20* (2013.01); *F05B 2270/32* (2013.01); *F05B 2270/328* (2013.01)

(58) Field of Classification Search
USPC .................................................. 290/44, 55
See application file for complete search history.

(56) References Cited

U.S. PATENT DOCUMENTS

| | | | | |
|---|---|---|---|---|
| 8,058,740 | B2* | 11/2011 | Altenschulte | F03D 7/0204 290/44 |
| 8,227,695 | B2* | 7/2012 | Ueno | F03D 80/85 174/79 |
| 8,274,170 | B2* | 9/2012 | Kassner | F03D 80/00 290/55 |
| 8,366,396 | B2* | 2/2013 | Barton | H02G 3/32 416/146 R |
| 10,047,727 | B2* | 8/2018 | Roer | F03D 80/85 |
| 10,352,297 | B2* | 7/2019 | Richert | H02K 7/1838 |
| 10,385,831 | B2* | 8/2019 | Maryniok | H02G 3/30 |
| 10,519,929 | B2* | 12/2019 | Hiremath | G05B 19/04 |
| 10,533,539 | B2* | 1/2020 | Nielsen | F03D 80/85 |
| 10,541,523 | B2* | 1/2020 | Wang | H02G 3/30 |
| 10,612,527 | B2* | 4/2020 | Chacon | F03D 80/85 |
| 2006/0199411 | A1* | 9/2006 | Singh | H01R 13/625 439/314 |
| 2008/0210826 | A1* | 9/2008 | Ockels | F03D 5/00 244/155 A |
| 2009/0120683 | A1* | 5/2009 | Hybiske | A47B 21/06 174/480 |
| 2009/0206610 | A1* | 8/2009 | Martin | F03D 80/85 290/55 |
| 2010/0006710 | A1* | 1/2010 | Lyness | F03D 80/85 248/70 |
| 2011/0133455 | A1* | 6/2011 | Altenschulte | F03D 7/0204 290/44 |
| 2012/0133144 | A1* | 5/2012 | Barton | H02G 11/00 290/55 |
| 2013/0106109 | A1* | 5/2013 | Richert | F03D 13/20 290/44 |
| 2013/0106112 | A1* | 5/2013 | Moestrup | F03D 80/85 290/55 |
| 2014/0217741 | A1* | 8/2014 | Christensen | F03D 80/85 290/55 |
| 2014/0316838 | A1 | 10/2014 | Zhou et al. | |
| 2015/0084439 | A1* | 3/2015 | Trzemzalski | F03D 9/255 307/326 |
| 2015/0180186 | A1* | 6/2015 | Vander Lind | H01R 35/02 290/55 |
| 2015/0260166 | A1* | 9/2015 | Olesen | F03D 80/85 290/55 |
| 2017/0074246 | A1* | 3/2017 | Richert | F03D 80/70 |
| 2017/0074248 | A1* | 3/2017 | Enis | F03D 9/18 |
| 2017/0097110 | A1* | 4/2017 | Hamsho | H02G 3/32 |
| 2018/0128241 | A1 | 5/2018 | Hiremath et al. | |
| 2018/0355852 | A1* | 12/2018 | Chacon | F03D 80/85 |

OTHER PUBLICATIONS

Dai Chunyan et al.: "Study on the prevent cable twisting control strategy of wind turbine yaw control system", 2013 2$^{nd}$ International Symposium on Instrumentation and Measurement. Sensor Network and Automation (IMSNA), IEEE, Dec. 23, 2013, pp. 420-424.

* cited by examiner

METHOD FOR OPERATING A WIND TURBINE AND A WIND TURBINE SYSTEM

BACKGROUND OF THE INVENTION

The subject matter described herein relates generally to methods and systems for wind turbines, and more particularly, to methods and systems for operating a wind turbine.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electrical energy.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

BRIEF DESCRIPTION OF THE INVENTION

In a first aspect, a method for operating a wind turbine for generating electrical energy is provided comprising the steps as described below. The wind turbine comprises a nacelle being rotatably supported on a tower of the wind turbine, in particular wherein at least one tower cable is provided in the tower for electrically connecting the nacelle and/or components thereof to e.g. an electrical installation on a ground of the tower. In one step of the method an early untwist operation for untwisting the tower cables of the wind turbine is initiated at a first specific time. In addition, a future power generation of the wind turbine is predicted for a certain prediction period at least by analyzing a prediction of the wind, in particular by analyzing at least wind direction forecast information and/or wind speed forecast information. The first specific time for initiating the early untwist operation is determined such that an overall predicted energy generation of the wind turbine over the certain prediction period is maximized, or that a predicted energy loss caused by an untwist operation is minimized.

In a second aspect, a method for operating a wind turbine for generating electrical energy is provided comprising the steps as described below. The wind turbine comprises a nacelle being rotatably supported on a tower of the wind turbine, in particular wherein at least one tower cable is provided in the tower for electrically connecting the nacelle and/or components thereof to e.g. an electrical installation on a ground of the tower. The method comprises initiating an early untwist operation for untwisting tower cables of the wind turbine at a twist angle threshold of the nacelle, for example, if a current twist angle of the cable exceeds a twist angle threshold. The twist angle threshold is smaller than a maximum acceptable twist angle of the cable. Furthermore, it is required for initiating the early untwist operation, that a first condition is fulfilled. This is the case, if a current power generation of the wind turbine, in particular including a short term assessment of energy generation, is less than a specific and/or determined power generation threshold of the wind turbine, in particular wherein the power generation threshold is equal or less to the maximum rated power generation of the wind turbine, or if a current wind speed, in particular including a short term assessment of a wind speed, is less than a wind speed threshold.

Generally, twist angles and thresholds thereof as provided herein shall relate to a rotation of the nacelle in a clockwise and counterclockwise rotational direction. Hence, terms of comparison like "exceed, larger than, smaller than, reaching a threshold, etc." relate to absolute values. For example in the case of negative rotational angles, a twist angle of −720° is considered to be larger than a twist angle of −360°.

In a third aspect, a method for operating a wind turbine for generating electrical energy is provided comprising the steps as described below. The wind turbine comprises a nacelle being rotatably supported on a tower of the wind turbine, in particular wherein at least one tower cable is provided in the tower for electrically connecting the nacelle and/or components thereof to e.g. an electrical installation on a ground of the tower. The method comprises the initiating an early untwist operation for untwisting tower cables of the wind turbine at a twist angle threshold, hence, if a current twist angle of the cable exceeds a twist angle threshold. The twist angle threshold is smaller than a maximum acceptable twist angle of the cable. Further, an absolute value of the twist angle threshold is variable and is dependent on an amount of current power generation of the wind turbine. In particular, the twist angle threshold increases or at least remains at the same level with an increasing current power generation of the wind turbine. In particular, the twist angle threshold has a relatively low value at a relatively low power generation of the wind turbine and has a relatively high value at a relatively high power generation of the wind turbine.

In yet a fourth aspect, a wind turbine system for generating electrical energy having at least one control system and at least one wind turbine, wherein the wind turbine at least comprises a tower, a nacelle being vertically rotatably supported on the tower and a rotor being rotatably supported by the nacelle. Furthermore, at least one tower cable is provided in the tower for electrically connecting the nacelle and/or components thereof to e.g. an electrical installation on a ground of the tower. The control system can be integrated in the wind turbine or can be located at an external control arrangement, wherein the control system is configured such, that the at least one wind turbine can be operated according to a method according to one or a plurality of preceding aspects.

The described aspects of the invention provides the advantage, that the yield of the wind turbine can be increased. In particular, an early untwisting operation of the wind turbine—which mandatorily requires a shutdown of the power generation of the wind turbine—for the first time is performed at a specifically selected time and/or under specifically defined conditions such, that negative consequences of the shutdown of the wind turbine are reduced.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated by the figure. Each example is provided by way of explanation and is not meant as a limitation. For example, features illustrated or described as part of one embodiment can be used on or in conjunction with other embodiments to yield yet further embodiments. It is intended, that the present disclosure includes such modifications and variations.

The embodiments described herein include a method for operating a wind turbine and/or a wind turbine system according to a first, a second and/or a third aspect including a plurality of embodiments concerning either one or a plurality of said aspects. Furthermore, an embodiment of a wind turbine system comprising at least one wind turbine is provided.

All aspects of the invention relate to a method for operating a wind turbine, wherein the wind turbine may comprise a nacelle being rotatably supported on a tower of the wind turbine. Said wind turbine can have a rotor for transforming kinetic energy of an airflow (wind) into rotational energy, wherein a rotational axis of said rotor is at least partially arranged horizontally in the nacelle. For example, such horizontal support of the rotor includes embodiments of the rotor having an inclined rotational axis about +/−10° with regard to a horizontal orientation.

For benefiting from a plurality of wind directions the nacelle can be rotated on the top of the tower about an essentially vertical axis. For this purpose a yaw system having at least one yaw drive mechanism is provided effectively between nacelle and top of the tower. With the help of this yaw system a wind tracking of the nacelle is enabled. The nacelle may rotate such that the rotor of the wind turbine perpendicularly confronts the wind, which maximizes the energy generation of the wind turbine. This implies that the nacelle may rotate around the vertical axis according to the current wind direction.

Electrical components within the nacelle of the wind turbine can be connected to other electrical components at a base of the tower by at least one tower cable. For example, an electrical generator in the nacelle—which transforms the rotational energy of the rotor into electrical energy—may be connected to a transformer at the base of the tower by the tower cable, in particular by a plurality of tower cables.

The wind tracking executed by the yaw system of the wind turbine may induce a twist in the tower cable, in particular, if the wind direction rotates around the wind turbine. Hence, the nacelle needs to be rotated in in opposite rotational direction to the induced twist of the tower cable in order to untwist said cable. During said untwist operation the power generation of the wind turbine needs to be shut down.

The method for operating the wind turbine according to the first aspect provides a strategy for untwisting the tower cable, wherein—for the first time—a current and a future power generation/energy generation is taken into account. For example, the early untwist operation may be performed at a certain time when power generation and therefore the energy generation and a financial yield of the wind turbine is less than a power generation for a theoretical untwist operation performed at another time.

According to an embodiment of the first aspect, a first specific time for initiating an early untwist operation is determined such that a predicted first energy loss caused by an early untwist operation initiated at the first specific time is less than a second predicted energy loss caused by a another possible untwist operation which would be performed at a second specific time.

For example, a control system of the wind turbine or of a wind turbine system may simulate and therefore predict a future power generation of the wind turbine for a certain prediction period. This prediction may include a possible early untwist operation, which could be performed at an earlier time and a later time, wherein the overall energy generation—product of power generation and time—or energy losses of both simulation cases is/are compared. As a consequence, the wind turbine is operated such that the point in time for performing an early untwist operation and/or the duration thereof is determined such that energy losses are minimized and/or energy generation is maximized. In particular, it shall be included that an assessment as described above would result in no early untwist operation being initiated, because a late untwist operation when reaching a maximum twist angle threshold comes with an optimum yield of energy production of the wind turbine. In other words, in certain cases the time for initiating an early untwist operation coincides with the time for performing the late untwist operation at the maximum allowable twist angle.

In fact, the method may include simulating a power/energy generation for all possible points in time and/or for all possible early and/or mandatory late untwist operations, in particular for a certain prediction period. In addition, said results are compared with each other for identifying an optimal time, thus for identifying the first specific time for initiating an early untwist operation.

The method for operating a wind turbine according to the second aspect is in the area of the general inventive concept according the first aspect. In fact, the strategy for operating the wind turbine according to the second aspect provides the advantage that conditions for performing an early untwist operation are defined such, that an energy/power generation of the wind turbine can be maximized. Therefore, a maximum twist angle threshold and another twist angle threshold are introduced, wherein the twist angle threshold is smaller than the maximum twist angle threshold. The maximum twist angle threshold represents an absolute limit for a twist angle of the tower cable, and therefore for a number of allowable rotations of the nacelle due to wind tracking. When the nacelle reaches said maximum twist angle threshold an untwist operation in the following—a late untwist operation—should be performed for untwisting the tower cable. In particular, at this point no further twist can be induced in the cable.

For optimizing the energy generation and the yield of the wind turbine said early untwisting operation is performed when the tower cable and the nacelle exceed the twist angle threshold; thus, said early untwist operation is initiated earlier than required by the maximum twist angle threshold, thus, later than the late untwist operation. However, an additional first condition must be fulfilled before initiating the early untwist operation. Said first condition requires, that a current power generation of the wind turbine—which may include a short term assessment of energy generation in a near future, for example an average power generation for a certain period—is less than a specific and/or determined power generation threshold of the wind turbine.

As a result, an early untwist operation may be initiated or executed, if the wind turbine is currently not in a full or high power generation mode. This strategy for operating a wind turbine increase the chances that an untwist operation is performed during an operational phase with low energy generation. Subsequently performing an untwist operation during a high generation phase is prevented. Therefore, the overall yield of the wind turbine may be increased.

According to an embodiment of the second aspect, the method comprises predicting a predicted power generation of the wind turbine for a certain prediction period at least by analyzing a prediction of the wind. In particular the predicted power generation can be predicted by analyzing preferably wind speed forecast information, wherein according to an embodiment also wind direction forecast information can be used.

According to a further embodiment, the early untwist operation is initiated only if a second condition is fulfilled. Said second condition is fulfilled, if the current power generation is less than a predicted power generation, or if the current wind speed is less than a predicted wind speed. In particular, predicting a predicted power generation may result in a definition of the specific power generation threshold of the wind turbine, and/or in a definition of the wind speed threshold.

Such measure or measures may result in a further optimization of the method according to the second aspect such that the early untwist operation is only performed if such early untwist operation results in an optimization of energy generation with regard to a later operation of the wind turbine.

For example, a wind turbine is in partial power generation operation, wherein the wind speed enables the wind turbine to generate at 50% of the rated power. Without the use of the second condition, the control system of the wind turbine might initiate the early untwist operation, since the current twist angle exceeds the twist angle threshold and the current power generation is relatively low. However, in case the wind drops further, which might put the wind turbine in an idle operation, the early untwist operation at 50% of rated power would result in an energy loss compared to an untwist operation, which would be performed during idle operation.

The use of the second condition, in fact that a future power generation is predicted and taken into account, eliminates negative decisions such as the example presented above.

The method for operating a wind turbine according to the third aspect is principally driven by the same inventive concept as the method according to the first and the second aspect. In detail, the method according to the third aspect proposes an early untwist operation by introducing a twist angle threshold which is smaller than a maximum acceptable twist angle, thus which is smaller than a maximum twist angle threshold. However, in order to ensure a beneficial effect of the early untwist operation on the overall energy generation, the twist angle threshold varies according to a current power generation of the wind turbine and/or according to a short term assessment of the energy generation of the wind turbine. In particular, the higher the current power generation, the higher the twist angle threshold is. The twist angle threshold may remain the same during low and/or high power generation of the wind turbine, for example if the wind turbine generates less than 30%, in particular less than 25%, more particular less than 20%, of rated power generation, and/or if the wind turbine generates more than 70%, in particular more than 80%, more particular more than 90%, of rated power generation. In particular, the value of the variable twist angle threshold is monotonically rising function of rated power.

As an example, the variable twist angle threshold can at least be partially proportional to the current power generation of the wind turbine.

Additionally or alternatively, a look-up-table (LUT) for defining a relation between variable twist angle thresholds—thus, of a plurality of twist angle thresholds—and the related power generation of the wind turbine can be provided.

According to an embodiment of the third aspect, said method may include predicting a predicted power generation as described in context with an embodiment of the second aspect.

According to an embodiment, which may relate to all three aspects—thus, a general embodiment—, additional predicting a predicted twist angle of the tower cable is included, in particular for at least for a certain prediction period. For this purpose, a prediction of the wind is analyzed in particular by analyzing at least wind direction forecast information and/or wind speed forecast information.

Such predicted information could lead to an advantageous embodiment of the methods. For example, if the prediction provides the information, that—with the respective likelihood—a twist angle of the cable will not exceed the maximum twist angle threshold within the particularly reasonable prediction time or prediction period, then the strategy may include that an early untwist operation will not be performed, even when indicated by other conditions. In particular, if for example—according to the second aspect—the twist angle threshold is exceeded by the current twist angle and the current power generation is below the power generation threshold, an early untwist operation would be initiated. However, by introducing an additional condition for initiating the early untwist operation, disadvantageous consequences can be omitted.

Thus, according to a non-limiting embodiment, an additional condition for analyzing the necessity of an early untwist operation is included. In particular, the additional condition comprises predicting a predicted twist angle of the wind turbine.

According to a further general embodiment, the process of predicting a predicted twist angle takes into account an execution of at least one possible untwist operation. Hence, the predicted twist angle of the wind turbine is not only dependent on the change of the wind, in particular is not only performed by analyzing wind direction forecast information, but also takes into consideration a possible untwist operation and consequences thereof for the twist angle.

According to an embodiment, at least one of the predictions as mentioned above, for example, the prediction of a predicted twist angle, of predicted wind direction, of predicted wind speed, of predicted power generation and/or of predicted energy generation may be provided for at least a minimum prediction period.

For example, this minimum prediction period is at least as long as an untwist time period required for an untwist operation of about 360°.

According to a specific embodiment, the minimum prediction period includes at least time period required— according to a prediction of the predicted twist angle—until the predicted twist angle exceeds the maximum twist angle threshold. This embodiment does not collide with embodiments as described above; on the contrary, the prediction of the predicted twist angle can lead to a determination of the certain prediction period, which subsequently can be used for predicting power/energy generation of the wind turbine.

According to a further specific embodiment, the certain prediction period further includes a time period necessary for executing an untwist operation, if the predicted twist angle reaches the maximum twist angle threshold. For example, if the prediction of the predicted twist angle would result in the information, that the maximum twist angle threshold would be reached within, for example, eight hours. This would usually trigger an initiation of an untwist operation in eight hours, which may take, for example, two hours. However, the predicted wind direction further shows, that the predicted twist angle would be reduced during the theoretical untwist operation even without initiating the untwist operation, because the rotation of the predicted wind direction results in an effective untwisting of the cable. Hence, if the minimum prediction period includes a period of a possible untwist operation, the general effectiveness of the wind turbine can be improved.

According to a general embodiment, the number of rotations during an untwist operation and/or a duration of an untwist operation is determined such that an overall predicted energy generation of the wind turbine over a certain prediction period can be maximized.

Under certain conditions a complete untwist operation is not necessary to keep the wind turbine operational for a certain prediction time. For example, it may be necessary to untwist the tower cable only about one rotation in order to ensure that a maximum twist angle threshold is not exceeded. Hence, instead of untwisting the cable towards +/−360° with respect to an original 0°-untwisted position of the cable (complete untwist operation), an untwist operation is only conducted including a minimum amount of rotations such, that a related downtime of the wind turbine is minimized.

According to a general embodiment, the initiation of an early untwist operation may include that a control request for executing the early untwist operation is provided to an operational centre of the wind turbine, and/or that the early untwist operation of the wind turbine is executed immediately or without relevant delay. Hence, this embodiment provides the possibility that a person or an automated control logic being located at a location other than the wind turbine itself, makes the final decision as to whether an early untwist operation shall be conducted. Hence, the decision provided by the method according to the different aspects or embodiments thereof as discussed above, namely whether an early untwist operation is to be performed, can be confirmed or declined by a third party person or machine.

As used herein, the term "early untwist operation" is intended to represent an operation of the wind turbine for reducing a twist of the tower cables, wherein such early untwist operation is initiated not later, particularly earlier, than a late untwist operation, which would be initiated, if the twist angle of the tower cable reaches a maximum twist angle threshold. According to a possible—not limiting—interpretation of the term "early untwist operation" the usage of the expression "early" shall not necessarily require that a late untwist operation being performed after the early untwist operation is executed. In particular, the usage of the word "early" may have language-wise a similar function as providing a specific name to the (early) untwist operation performed earlier than a (possible late), the latter being initiated mandatorily when the tower cable reaches a maximum twist angle threshold.

As used herein, the term "rated power" shall represent an intended maximum power output of the wind turbine. In the context of this patent application, information about the power output of the wind turbine is only provided in relation to rated power, thus, the power output varies from 0 to 100% of rated power, respectively from 0 to 1 rated power.

As used herein, the term "control center" describes a specific installation dedicated for controlling and/or supervising an operation of a wind turbine. For example, such control centers can be SCADA-centers or computers. In particular, the control center is not required to be embodied as a dedicated location, but can also be a decentralized logical control network, wherein staff may have access to data and control values of the wind turbine.

As used herein, the term "current twist angle" is intended to be representative for an overall twist of a tower cable with respect to a non-twisted position of the power cable. In particular, the current twist angle may be equal to a rotational position of the nacelle with respect to the tower, in particular with respect to an original mounting position of the nacelle on the tower.

As used herein, the term "blade" is intended to be representative of any device that provides a reactive force when in motion relative to a surrounding fluid.

As used herein, the term "wind turbine" is intended to be representative of any device that generates rotational energy from wind energy, and more specifically, converts kinetic energy of wind into mechanical energy.

Figure 1:
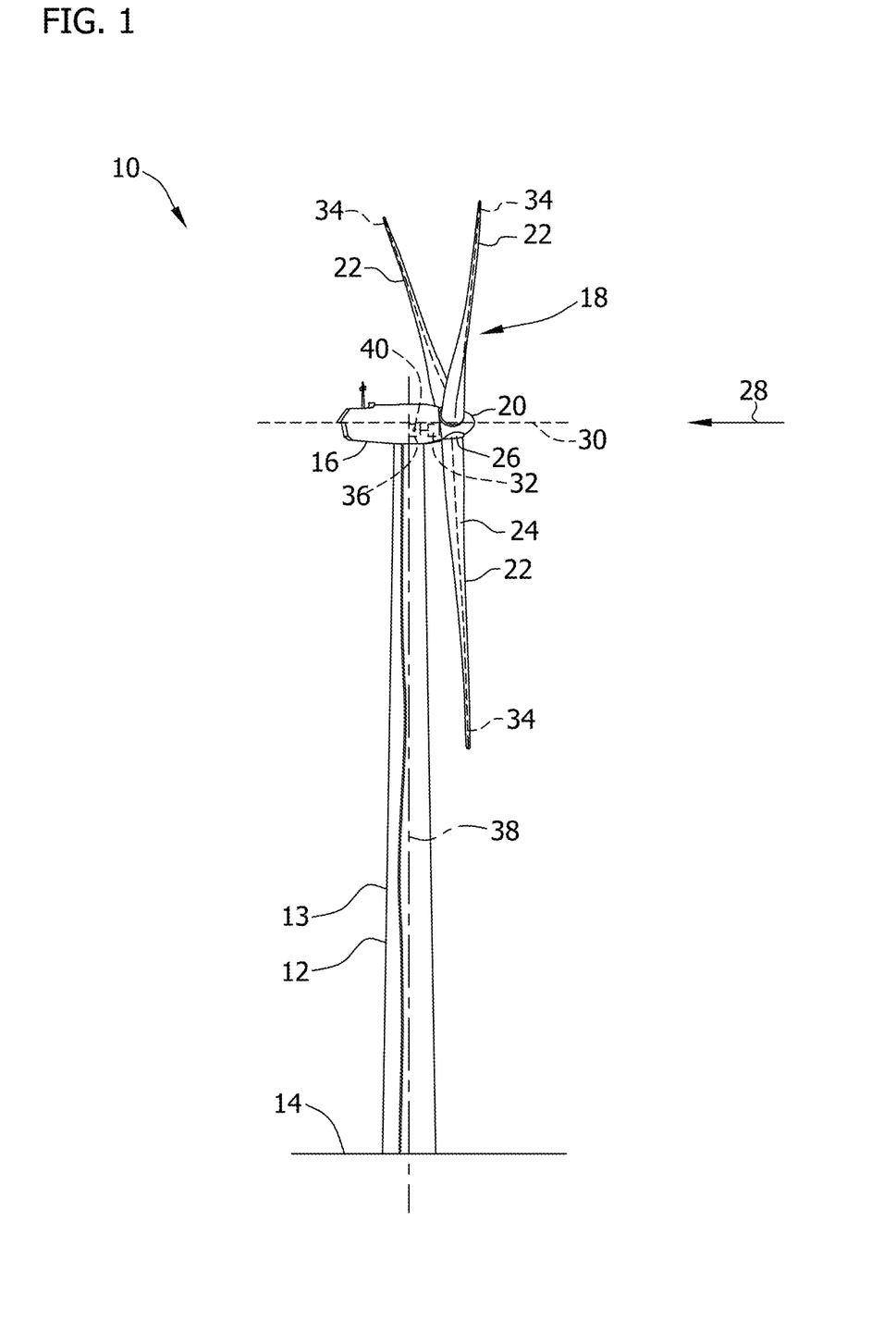
FIG. 1 is a perspective view of an exemplary wind turbine.

FIG. 1 is a perspective view of an exemplary wind turbine 10. In the exemplary embodiment, wind turbine 10 is a horizontal-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a wind direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch (adjustment) system 32 to control the load and power generated by wind turbine 10 by adjusting an angular position of at least one rotor blade 22 relative to wind vectors. Pitch axes 34 for rotor blades 22 are shown. During operation of wind turbine 10, pitch system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as wind direction 28 changes, a yaw direction of nacelle 16 may be controlled about a yaw axis 38 to position rotor blades 22 with respect to wind direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information and instructions to the processors during execution of instructions by the processor(s). Instructions that are executed may include, without limitation, wind turbine control system control commands. The execution of sequences of instructions is not limited to any specific combination of hardware circuitry and software instructions.

The control system 36 including components and items as mentioned above, for example the controller and/or various connections for transmitting signals, in particular sensor signals, are embodied and/or configured such, that a method according to one of the aspects and/or according to various embodiments can be conducted.

In the exemplary embodiment, a controller is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, the controller may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring within a substantially short period of time after a change in the inputs has affected the outcome, with the time period being a design parameter that may be selected based on the importance of the outcome and/or the capability of the system processing the inputs to generate the outcome.

Figure 2:
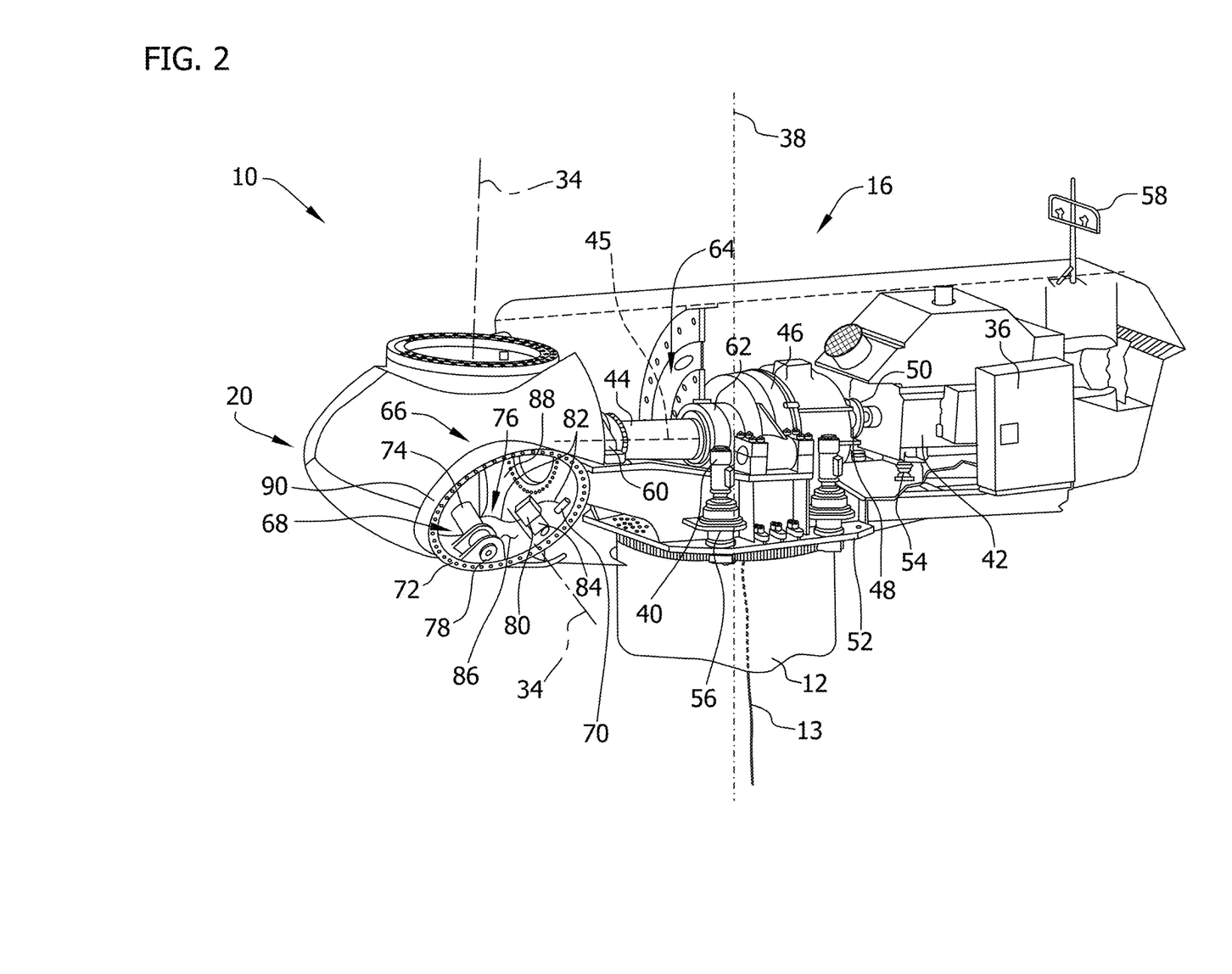
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed at least partially coaxially to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates generation of electrical power by generator 42. Gearbox 46 and generator 42 are supported by a main support 52, optionally embodied as a main frame. In the exemplary embodiment, gearbox 46 utilizes a dual path geometry to drive high speed shaft 48. Alternatively, rotor shaft 44 is coupled directly to generator 42 with coupling 50.

Nacelle 16 may be connected to electrical components on a ground of the wind turbine by a tower cable 13. In particular a plurality of tower cables 13 may be provided for transmitting electrical energy generated by electrical generator 42 to an electrical component on the ground, wherein additional cables for transmitting information may be provided parallel to tower cable 13 or integrated with tower cable 13.

Nacelle 16 has a yaw system including a yaw drive mechanism 56 that may be used to rotate nacelle 16 and hub 20 on yaw axis 38 to control the perspective of rotor blades 22 with respect to direction 28 of the wind, hence, for enabling wind tracking of wind turbine 13. Yaw drive mechanism 56 may include a twist angle sensor 40 in order to keep track of the rotational position of nacelle 16 with regard to tower 12, which also is representative for a twist angle of tower cable 13.

Nacelle 16 also includes at least one meteorological mast 58 that includes a wind vane and anemometer (neither shown in FIG. 2) for measuring a current wind speed 109 and/or a current wind direction 107. Mast 58 may provide such information to control system 36.

Controller 36 of wind turbine 10 may also be connected with external weather information sources in order to obtain wind direction forecast information 106 and/or wind speed forecast information 108.

In the exemplary embodiment, nacelle 16 also includes a main forward support bearing 60 and a main aft support bearing 62. Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In the exemplary embodiment, hub 20 includes a pitch assembly 66 of the pitch system 32. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
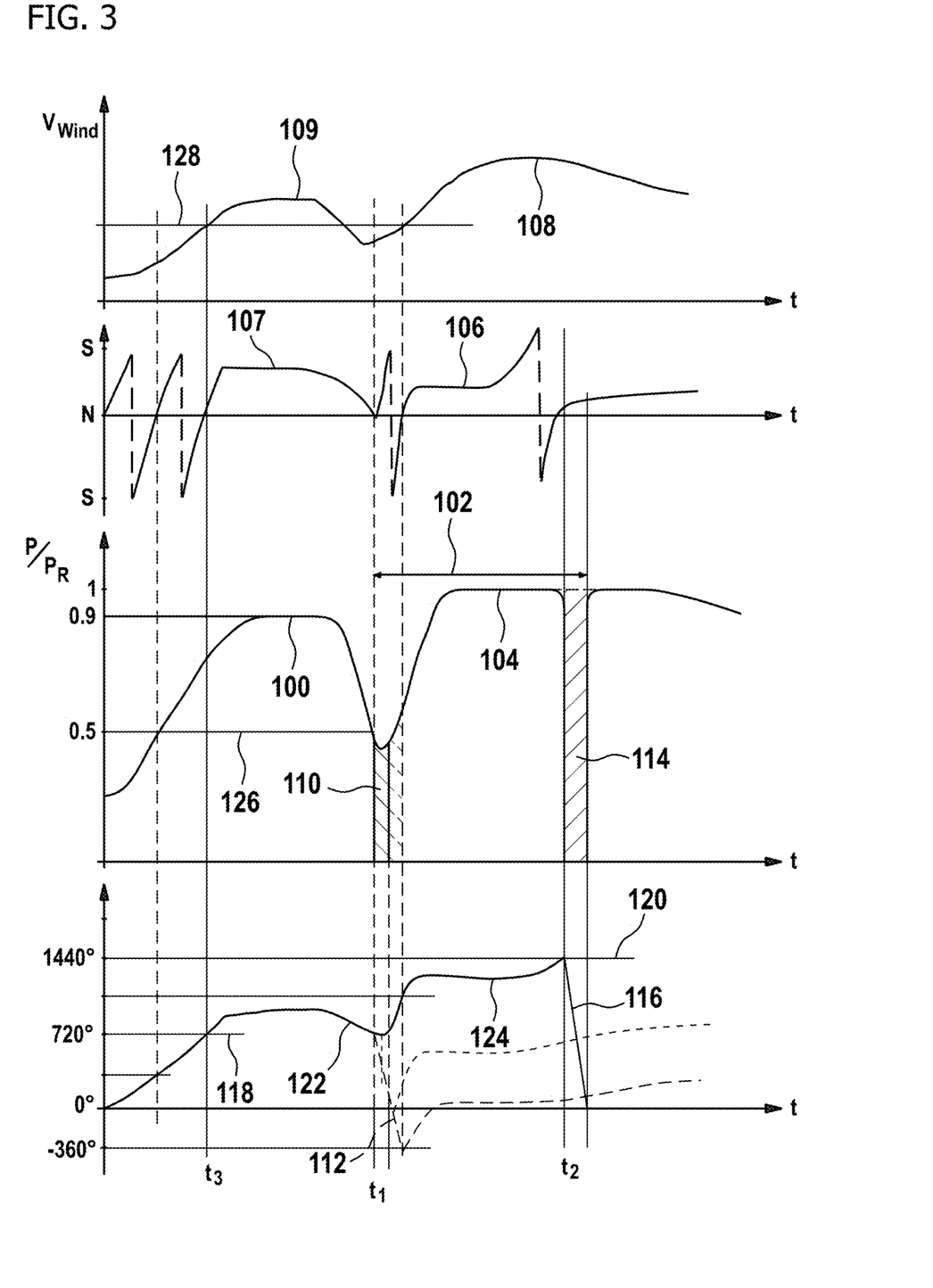
FIG. 3 depicts an exemplary embodiment for operating the wind turbine according to FIG. 1 and FIG. 2.

FIG. 3 provides an exemplary realization of the claimed methods and/or of embodiments thereof, wherein no limitation shall be compellingly conveyed by specific details. FIG. 3 contains four graphs representing (starting from top of the page) a past wind speed 109, a current with speed and a wind speed forecast information 108, a past wind direction 107, a current wind direction and a wind direction forecast information 106, a past power generation 100, a current and a predicted power generation 104, and a past twist angle 122, a current and a predicted twist angle 124 of the tower cable 13.

In order to simplify the understanding, the current time of an exemplary observer is represented by t1. Thus, the graph on the left side of t1 represents the past, and the graph on the right side of t1 shows predictions.

In the past, wind speed 109 of the wind coming up on wind turbine 10 ascended smoothly, wherein in the beginning wind direction 107 rotated twice around wind turbine 10 until reaching a relatively stable western-direction. As a consequence, the wind tracking of wind turbine 10 controlled yaw drive mechanism 56 such that until time t3 nacelle 16 of wind turbine 10 rotates twice around yaw axis 38. Thus, nacelle 16 performs two revolutions about 720°. This leads to a twist angle of power cable 13 of 720° at the time t3.

In the example of FIG. 3 a maximum twist angle threshold is +/−1440°, hence, nacelle 16 may rotate four times around its own vertical axis in each direction. When reaching the maximum twist angle threshold no further twist must be induced in power cable 13, and a so called late untwist operation is initiated.

It is to be explicitly stated that the number of revolutions of nacelle 16 around yaw axis 38 in FIG. 3 must be understood as a non-limiting embodiment. In particular the maximum twist angle threshold of 1440° (four rotations) does not limit the scope of the invention, in particular it may be favorable that a maximum twist angle threshold is equal or less than 1080° (three rotations), in particular equal or less than 900° (2.5 rotations) in each direction.

Generally, a maximum twist angle threshold is applicable for a clockwise rotational direction and a counterclockwise rotational direction. Thus, values for a maximum twist angle threshold as mentioned above include negative values of said twist angles and/or nacelle rotations.

A power generation 100 of wind turbine 10 rises in accordance to increasing wind speed 109 to a preliminary maximum of 0.9 of rated power $P_R$ (90% $P/P_R$).

A while after reaching said preliminary maximum, wind 109 has dropped by the current time t1 such that power generation of the wind turbine 10 at time t1 is at 0.5 of rated power $P_R$.

According to the first aspect, at t1 or even earlier control system 36 may perform a prediction of the predicted power generation 104. For this purpose a predicted wind speed is predicted, wherein usually wind speed forecast information 108 is used. However, the usage of wind speed forecast information 108 shall not limit the invention, in particular a specific predicted wind speed can be locally predicted by a specific wind turbine controller and/or wind park controller, wherein local influences on wind speed and/or a wind direction are taken into account.

Any prediction of power generation, twist angle, wind speed and/or wind direction can be provided by a suitable operational/control unit or other sources.

As a result of the prediction, a power curve of predicted power generation 104 is provided.

According to the first aspect, a plurality of possibilities for initiating and/or executing an untwist operation is evaluated. In particular, according to the example of FIG. 3, a first predicted energy loss 110 caused by a possible early untwist operation 112 at time t1 is compared with a second predicted energy loss 114 caused by a second possible untwist operation 116 at time t2. According to a non-limiting embodiment, the second possible untwist operation 116 can also be understood as being a late untwist operation 116. The same step, additionally or alternatively, of an overall energy generation of wind turbine 16 by time t5 can be predicted by multiplying predicted power generation 104 by time, in one case including a possible early untwist operation 112 at time t1, and in an alternative case including a second possible untwist operation 116 at time t2 (which in this case is a late untwist operation). Subsequently, it shall be decided in which case energy generation is maximized.

Hence, according to the first aspect, the method provides the possibility to identify a beneficial effect on energy generation when performing an early untwist operation 112 in comparison to a (late) second untwist operation 116.

According to an embodiment, an early untwist operation 112 is initiated in particular by transmitting a related request to a control center of wind turbine 10. Further, trained personal and/or an automated decision arrangement may agree or refuse an early untwist operation 112.

If early untwist operation 112 is performed, a complete untwisting to 0° or even a further untwist operation to −360° can be done (dashed lines). The latter is in particular beneficial, if a predicted twist angle 124 indicates an additional induction of a twist into power cable 13 according to wind direction forecast information 106.

According to an embodiment, a prediction of predicted power generation 104 can be performed for a certain prediction period 102, which can be at least as long as a twist angle of cable 13 having reached a maximum twist angle threshold. Therefore, the usage of a predicted twist angle 124 may be supportive for optimizing energy generation, in particular, for defining a certain prediction period 102. Prediction period 102 may include time period (between t5 and t2) of a second possible untwist operation 116. Due to the fact that without an early untwist operation 112 at time t1, a late (second possible) untwist operation 116 would be necessary at time t2, the definition of the certain prediction period 102 up to time t5 is reasonable.

A method for operating wind turbine 10 according to the second aspect will be explained in the following. According to this embodiment, a power generation threshold 126 is provided, which according to the example, is 0.5 $P_R$, thus, 50% of rated power. Furthermore a twist angle threshold 118 is defined, which in this example is 720°, therefore two revolutions of nacelle 16 with respect to tower 12.

Twist angle threshold 118 (e.g. 720°) is smaller than a maximum twist angle threshold 120 (e.g. 1440°).

At time t3 a twist angle of cable 13 exceeds twist angle threshold 118 because the wind direction rotated twice around wind turbine 10. However, an early untwist operation is not performed at this time, since a required first condition is not fulfilled yet.

According to the definition of the first condition, the current power generation must be under a specific power generation threshold 126 and/or a wind speed must be less than a wind speed threshold 128.

Such fulfillment of the first condition is present at time t1, wherein generated power drops below 0.5 rated power and therefore under power generation threshold 126. Furthermore, the wind speed goes below wind speed threshold 128, wherein it is sufficient, that one of both requirements are fulfilled. It is also possible to use only one requirement.

As a consequence, early untwist operation 112 is initiated and executed. It is apparent, since wind speed picks up after time t1 that it is a beneficial decision to perform early untwist operation 112 at time t1. First energy loss 110 is smaller than second (predicted) energy loss 114.

The method according to the second aspect can be improved further, if a second condition is applied before initiating an early untwist operation 112. Said second condition ensures that power generation after time t1 would not decrease further on. In such case, an early untwist operation 112 at time t1 would result in an increased loss of energy generation compared to a possible untwist operation performed later on.

Figure 4:
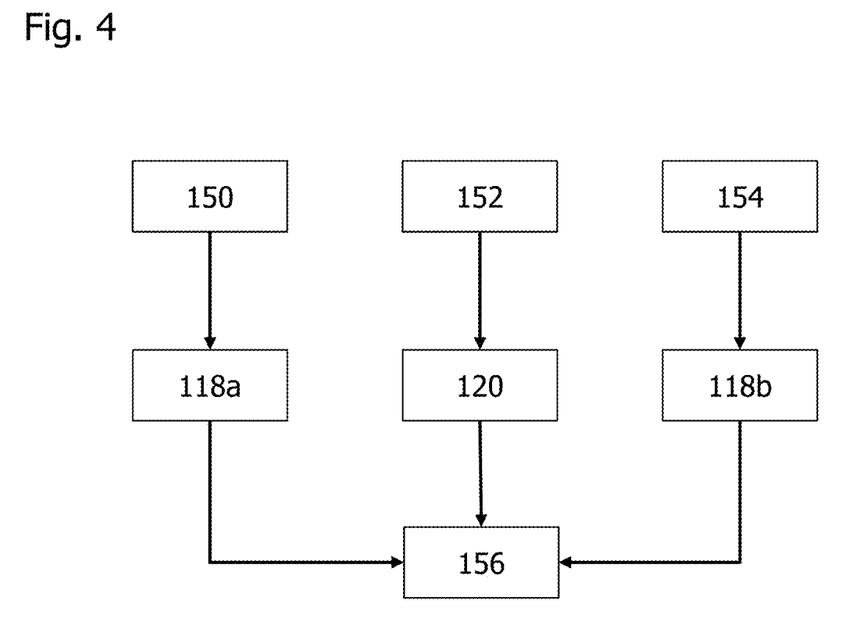
FIG. 4 is a diagram representing different modes of operation of the wind turbine according to FIG. 1 and FIG. 2.

FIG. 4 depicts an embodiment of an aspect of the invention, in particular according to an embodiment of the second and third aspect. As an example, wind turbine 10 is shown in three operational modes 150, 152, 154.

According to mode 150, wind turbine 10 is in idle operation, wherein no energy is generated, in particular because wind speed is either below cut-in wind speed or above cut-out wind speed. A low twist angle threshold 118*a* is provided during idle operation 150; if the low twist angle threshold 118*a* is exceeded by the current twist angle of cable 13 of wind turbine 10, which for example is measured by detecting an angular motion of the nacelle 16 about the yaw axis 38, further measures 156, including initiating an untwist operation 16 and/or a complete shutdown of the wind turbine.

If the wind turbine as an operational mode 152, the wind turbine generates power in a reduced range. In particular, the wind turbine 10 generates less than 0.95 rated power, more particular less than 0.5 rated power.

According to operational mode 154, the amount of generated power of the wind turbine is relatively high. For example, wind turbine 10 generates more than 0.5 rated power, more particular more than 0.95 rated power.

During operational mode 152, a high twist angle threshold 118*b* is applied in order to determine whether an early untwist operation 112 is to be initiated.

If the wind turbine generates elevated power according to operational mode 154, a maximum twist angle threshold 120 is used.

Twist angle thresholds, as provided in this example, are to be understood relatively to each other with regard to a related value. The high twist angle threshold 118*a* is larger than a low twist angle threshold 118*b*, wherein both twist angle thresholds 118*a* and 118*b* are smaller than the maximum twist angle threshold 120. According to a non-limiting example, the low twist angle threshold 118*a* is between 180° and 360° (in clockwise and counterclockwise direction, which results in a range from −360° to +360°). The high twist angle threshold 118*b* May range between +/−360° to +/−700°, in particular to +/−710°. The maximum twist angle threshold may be +/−720°, thus, if nacelle 16 rotates twice around yaw axis 38 an untwist operation 116, in particular the late untwist operation, must be initiated mandatorily.

According to the example of FIG. 4, twist angle thresholds 118*a*, 118*b*, 120 increase with an increasing current power generation 100.

According to an example, in particular to the example of FIG. 4, the method according to the second aspect provides a first measuring/monitoring a current twist angle 122 of a tower cable 13.

According to a further step, a power generation status of wind turbine 10 is identified. In particular, it is examined whether wind turbine 10 is in an idle mode 150, in operational mode 152 with reduced power generation or in operational mode 154 reduction with high power generation. According to a non-limiting example, wind turbine 10 in operational mode 152 generates less than 0.95 rated power, more particular less than 0.5 rated power, and in operational mode 154 wind turbine 10 generates more than 0.5 rated power, more particular more than 0.95 rated power.

The identification of an operational mode of wind turbine 10 maybe performed by comparing a current power generation 100 of wind turbine 10 to a power generation threshold 126, wherein the power generation threshold 126 is specified such, that an operational status of wind turbine 10 can be defined by its specific power generation threshold 126.

According to the operational mode as identified in the step earlier, different twist angle threshold 118*a*, 118*b*, 120 are applied in order to determine whether an early untwist operation 112 is to be initiated, or if a later According to an additional step, the current twist angle 122 is compared to a twist angle threshold 118*a*, 118*b*, 120.

Figure 5:
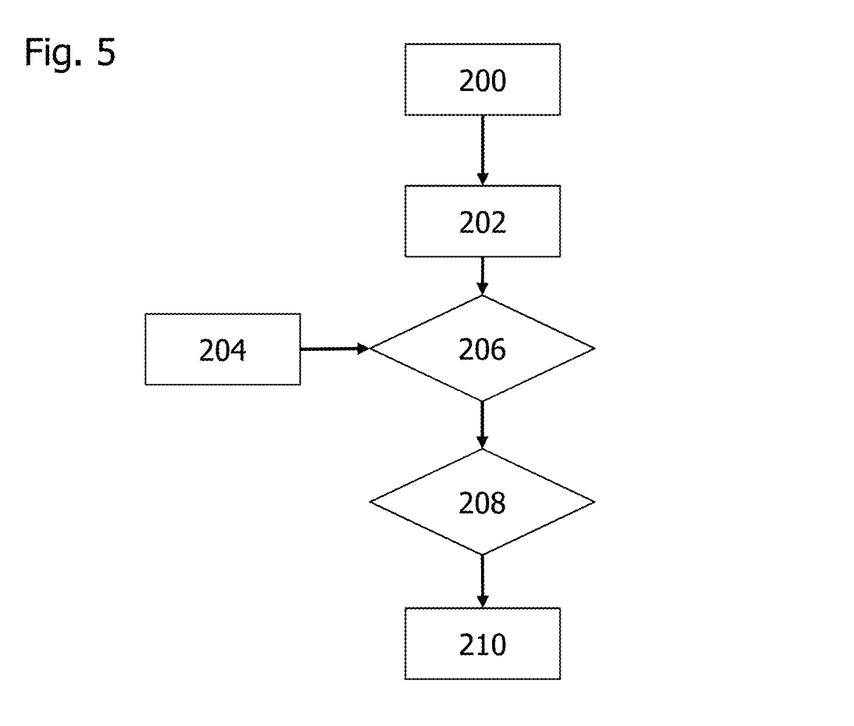
FIG. 5 is a flow chart depicting an aspect of operating the wind turbine according to FIG. 1 and FIG. 2.

According to the flowchart of FIG. 5 a wind turbine (10) having a nacelle 112 being rotatably supported about a vertical yaw axis 38 on a tower 12 of the wind turbine 10, wherein at least one tower cable 13 is provided between nacelle 16 and the tower 12, can be operated.

In a first step 200 a current power generation 100 is detected and/or monitored, for example by measuring a current and voltage or by further suitable measures. In step 200, alternatively or additionally, a predicted power generation 104 of wind turbine 10 can be predicted.

In a second step 202 the actual twist angle 122 of tower cable 13 is measured, monitored or detected. Due to the fact, that control system 36 or a control system of yaw drive mechanism 38 is aware of the current rotational position of nacelle 16, current twist angle 122 is available to the control system.

Furthermore, a twist angle threshold 118, 118*a*, 118*b* is provided in step 204, wherein the twist angle threshold 118, 118*a*, 118*b* is smaller than a maximum twist angle threshold 120. In particular, step 204 can be executed once, even before wind turbine 10 is installed, wherein threshold 118, 118*a*, 118*b* are applied during the operation of wind turbine 10.

In step 206 is determined whether a first condition is fulfilled. Said condition is fulfilled, if a current power generation 100 and/or a predicted power generation 104 of the wind turbine 10, in particular including a short term assessment of energy generation, is less than a specific power generation threshold 126 of the wind turbine 10, in particular wherein the power generation threshold 126 is equal or less to the maximum rated power generation of the wind turbine 10, or if a current wind speed 109 an/or a predicted wind speed, in particular including a short term assessment of a wind speed, is less than a wind speed threshold 128.

During step 208 the current twist angle 122 obtained in step 202 is compared with the twist angle threshold 118, 118*a*, 118*b*.

If step 206 confirms the fulfillment of the first condition and the current twist angle 122 exceeds twist angle threshold 118, 118*a*, 118*b* an early untwist operation 112 it is initiated in step 210.

Figure 6:
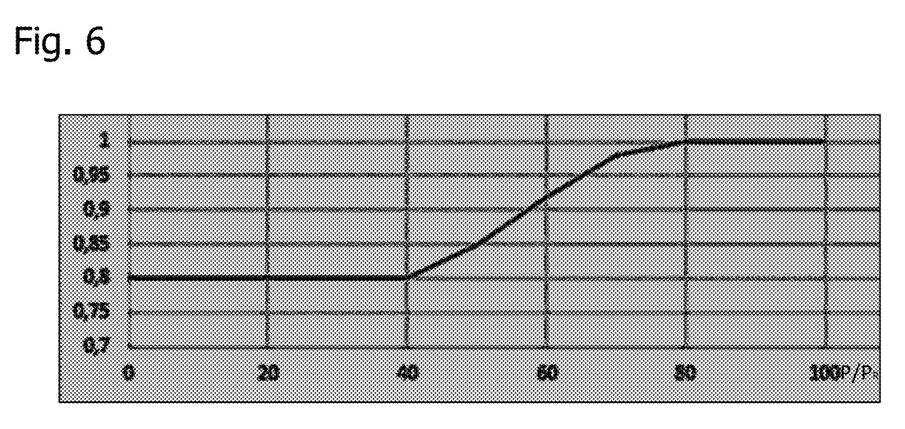
FIG. 6 is a diagram representing an exemplary embodiment of the third aspect for operating the wind turbine according to FIG. 1 and FIG. 2.

An embodiment according to the third aspect of the method shall be explained with the help of FIG. 6. In particular, FIG. 6 depicts an exemplary specification of a variable cable twist threshold 118, wherein the value of the cable twist threshold 118 varies with the power generation 100, wherein the variable cable twist threshold 118 and the power generation 100 are provided relatively to the maximum cable twist threshold 120 and the maximum rated power.

Hence, for each power generation below not higher than 40% of rated power an early untwist operation 112 will be initiated when the cable twist angle exceeds a twist angle threshold 118 which is 80% of the maximum twist angle threshold. When the wind turbine is generating power at 80% of rated power, there will be no early untwist operation 112 and/or the early untwist operation 112 will be initiated when the cable twist angle exceeds a maximum twist angle threshold (in this case the early untwist operation 112 results in the same untwist operation as a late untwist operation 116). It is apparent from FIG. 6, that the value of the variable twist angle threshold is monotonically rising function of rated power.

Exemplary embodiments of systems and methods for operating a wind turbine with optimized power generation are described above in detail. The systems and methods are not limited to the specific embodiments described herein, but rather, components of the systems and/or steps of the methods may be utilized independently and separately from other components and/or steps described herein. For example, described method may be applied for controlling a plurality of wind turbines and/or a wind park, and are not limited to practice with only the wind turbine systems as described herein. Rather, the exemplary embodiment can be implemented and utilized in connection with many other rotor blade applications.

Additionally and/or alternatively to aspects and/or embodiments as described above, in particular independent from mentioned aspects and/or embodiments, further aspects, items and features of the present invention are disclosed in the following.

1. A method for operating a wind turbine 10 having a nacelle 16 being rotatably supported about a vertical yaw axis 38 on a tower 12 of the wind turbine 10, wherein at least one tower cable 13 is provided between nacelle 16 and the tower 12, comprising the following blocks: predicting a future power generation 104 of the wind turbine 10 for a certain prediction period 102 at least by analyzing a prediction of the wind, in particular by analyzing at least wind direction forecast information 106 and/or wind speed forecast information 108; determining a first specific time t1 for initiating an early untwist operation 112 for untwisting tower cable 13 such, that an overall predicted energy generation of the wind turbine 10 over the certain prediction period 102 is maximized, or that a predicted energy loss caused by the early untwist operation is minimized; initiating the early untwist operation 112 at the specific time t1.

2. The method according to item 1, wherein the first specific time t1 is determined such that a first predicted energy loss 110 caused by the early untwist operation 112 initiated at the first specific time t1 is less than a second predicted energy loss 114 caused by a possible untwist operation 116 which would be performed at a second specific time t2.

3. A method for operating a wind turbine 10 having a nacelle 112 being rotatably supported about a vertical yaw axis 38 on a tower 12 of the wind turbine 10, wherein at least one tower cable 13 is provided between nacelle 16 and the tower 12, comprising the following blocks: monitoring and/or detecting a current power generation 100 and/or predicting a predicted power generation 104 of the wind turbine 10; monitoring and/or detecting a current twist angle 122 of a tower cable 13 of the wind turbine 10; determining a twist angle threshold 118, 118a, 118b, wherein the twist angle threshold 118, 118a, 118b is smaller than a maximum twist angle threshold 120; determining whether a first condition is fulfilled, which is fulfilled, if a current power generation 100 and/or a predicted power generation 104 of the wind turbine 10, in particular including a short term assessment of energy generation, is less than a specific power generation threshold 126 of the wind turbine 10, in particular wherein the power generation threshold 126 is equal or less to the maximum rated power generation of the wind turbine 10, or if a current wind speed 109 an/or a predicted wind speed, in particular including a short term assessment of a wind speed, is less than a wind speed threshold 128; comparing the current twist angle 122 with the twist angle threshold 118, 118a, 118b; and initiating an early untwist operation 112 if the current twist angle 122 exceeds the twist angle threshold 118, 118a, 118b and if the first condition is fulfilled.

4. The method according to item 3, comprising the block of predicting a predicted power generation 104 of the wind turbine 10 for a certain prediction period 102 at least by analyzing a prediction of the wind, in particular by analyzing at least wind direction forecast information 106 and/or wind speed forecast information 108.

5. The method according to item 4, wherein the early untwist operation is initiated only if a second condition is fulfilled, wherein the second condition is fulfilled if the current power generation 100 is less than a predicted power generation 104, or if the current wind speed 109 is less than a predicted wind speed.

6. A method for operating a wind turbine 10 having a nacelle 112 being rotatably supported about a vertical yaw axis 38 on a tower 12 of the wind turbine 10, wherein at least one tower cable 13 is provided between nacelle 16 and the tower 12, comprising the following blocks: monitoring and/or detecting a current twist angle 122 of a tower cable 13 of the wind turbine 10; monitoring and/or detecting a current power generation 100 and/or predicting a predicted power generation 104 of the wind turbine 10; determining a twist angle threshold 118, 118a, 118b, wherein the twist angle threshold 118, 118a, 118b is smaller than a maximum twist angle threshold 120 and wherein the twist angle threshold 118, 118a, 118b, in particular an absolute value of the twist angle threshold 118, 118a, 118b, is dependent on a current power generation 100 and/or a predicted power generation of the wind turbine 10 such, that the twist angle threshold 118 increases or at least remains with an increasing current power generation 100 and/or with a predicted power generation; comparing the current twist angle 122 with the twist angle threshold 118, 118a, 118b; and initiating an early untwist operation 112 if the current twist angle 122 exceeds the twist angle threshold 118, 118a, 118b.

7. The method according to one of the preceding items, wherein a predicted twist angle 124 of the tower cable 13 is predicted, in particular at least for a certain prediction period 102, at least by analyzing a prediction of the wind, in particular by analyzing at least wind direction forecast information 106 and/or wind speed forecast information 108.

8. Method according to item 7, wherein the process of predicting a predicted twist angle 124 takes into consideration an execution of at least one possible untwist operation.

9. Method according to one of the preceding items, in particular according to item 1, 3 and/or 6, wherein a maximum twist angle threshold 120 is determined, in particular wherein an untwist operation is initiated mandatorily if the current twist angle 122 reaches the maximum twist angle threshold 120.

10. Method according to one of the items 1, 4 to 9, wherein the certain prediction period 102 is at least as long as an untwist time period required for an untwist operation of about 360°.

11. Method according to one of the items 9 to 10, wherein the certain prediction period 102 is at least as long as a predicted twist angle 124 having reached the maximum twist angle threshold 120, in particular including the time of executing an late untwist operation.

12. Method according to one of the preceding items, wherein the duration of an untwist operation and/or a number of rotations of the untwist operation is determined such that an overall predicted energy generation of the wind turbine 10 over a certain prediction period 102 is maximized.

13. Method according to one of the preceding items, wherein the number of untwisting rotations of the nacelle 16 during an untwist operation is less than the number of necessary rotations for bringing the nacelle 16 into a rotational position of less than 360° with respect to the tower 12, and/or wherein the untwist operation comprises less than three rotations of the nacelle 16, preferably less than two rotations.

14. Method according to one of the preceding items, wherein the block of initiating an early untwist operation 112 of the wind turbine 10 comprises the blocks of automatically providing a control request for executing the early untwist operation to a control center of the wind turbine 10, and/or automatically executing the early untwist operation of the wind turbine 10.

15. Wind turbine system having at least one control system 36 and at least one wind turbine 10, wherein the wind turbine 10 at least comprises a tower, a nacelle 16 being rotatably supported about a vertical yaw axis 38 on a tower 12 of the wind turbine 10, wherein at least one tower cable 13 is provided between nacelle 16 and the tower 12, a yaw drive mechanism 56 for performing a rotation of the nacelle 16 around yaw axis 38, a rotor being rotatably supported by the nacelle 16, wherein the control system 36 can be integrated in the wind turbine 10 or can be located at an external control arrangement, and wherein the control system 36 is configured for predicting a future power generation 104 of the wind turbine 10 for a certain prediction period 102 at least by analyzing a prediction of the wind, in particular by analyzing at least wind direction forecast information 106 and/or wind speed forecast information 108, determining a first specific time t1 for initiating an early untwist operation 112 for untwisting tower cable 13 such, that an overall predicted energy generation of the wind turbine 10 over the certain prediction period 102 is maximized, or that a predicted energy loss caused by the early untwist operation is minimized, and initiating the early untwist operation 112 at the specific time t1, and/or in particular, wherein the control system 36 is configured such that the at least one wind turbine 10 can be operated according to a method according to one or a plurality of the preceding items.

16. Wind turbine system having at least one control system 36 and at least one wind turbine 10, wherein the wind turbine 10 at least comprises a tower, a nacelle 16 being rotatably supported about a vertical yaw axis 38 on a tower 12 of the wind turbine 10, wherein at least one tower cable 13 is provided between nacelle 16 and the tower 12, a yaw drive mechanism 56 for performing a rotation of the nacelle 16 around yaw axis 38, a rotor being rotatably supported by the nacelle 16, wherein the control system 36 can be integrated in the wind turbine 10 or can be located at an external control arrangement, and wherein the control system 36 is configured for monitoring and/or detecting a current power generation 100 and/or predicting a predicted power generation 104 of the wind turbine 10, monitoring and/or detecting a current twist angle 122 of a tower cable 13 of the wind turbine 10, determining a twist angle threshold 118, 118a, 118b, wherein the twist angle threshold 118, 118a, 118b is smaller than a maximum twist angle threshold 120, determining whether a first condition is fulfilled, which is fulfilled, if a current power generation 100 and/or a predicted power generation 104 of the wind turbine 10, in particular including a short term assessment of energy generation, is less than a specific power generation threshold 126 of the wind turbine 10, in particular wherein the power generation threshold 126 is equal or less to the maximum rated power generation of the wind turbine 10, or if a current wind speed 109 an/or a predicted wind speed, in particular including a short term assessment of a wind speed, is less than a wind speed threshold 128, comparing the current twist angle 122 with the twist angle threshold 118, 118a, 118b, and initiating an early untwist operation 112 if the current twist angle 122 exceeds the twist angle threshold 118, 118a, 118b and if the first condition is fulfilled, and/or in particular, wherein the control system 36 is configured such that the at least one wind turbine 10 can be operated according to a method according to one or a plurality of the preceding items.

Wind turbine system having at least one control system 36 and at least one wind turbine 10, wherein the wind turbine 10 at least comprises a tower, a nacelle 16 being rotatably supported about a vertical yaw axis 38 on a tower 12 of the wind turbine 10, wherein at least one tower cable 13 is provided between nacelle 16 and the tower 12, a yaw drive mechanism 56 for performing a rotation of the nacelle 16 around yaw axis 38, a rotor being rotatably supported by the nacelle 16, wherein the control system 36 can be integrated in the wind turbine 10 or can be located at an external control arrangement, and wherein the control system 36 is configured for monitoring and/or detecting a current twist angle 122 of a tower cable 13 of the wind turbine 10; monitoring and/or detecting a current power generation 100 and/or predicting a predicted power generation 104 of the wind turbine 10; determining a twist angle threshold 118, 118a, 118b, wherein the twist angle threshold 118, 118a, 118b is smaller than a maximum twist angle threshold 120 and wherein the twist angle threshold 118, 118a, 118b, in particular an absolute value of the twist angle threshold 118, 118a, 118b, is dependent on a current power generation 100 and/or a predicted power generation of the wind turbine 10 such, that the twist angle threshold 118 increases or at least remains with an increasing current power generation 100 and/or with a predicted power generation; comparing the current twist angle 122 with the twist angle threshold 118, 118a, 118b; and initiating an early untwist operation 112 if the current twist angle 122 exceeds the twist angle threshold 118, 118a, 118b, and/or in particular, wherein the control system 36 is configured such that the at least one wind turbine 10 can be operated according to a method according to one or a plurality of the preceding items.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

NUMERALS 10 wind turbine
12 tower 13 tower cable
14 support system
16 nacelle
18 rotor
20 rotatable hub
22 rotor blades
24 blade root portion
26 load transfer regions
28 direction
30 axis of rotation
34 Pitch axes
36 control system
38 yaw axis
40 twist angle sensor
42 electric generator
44 rotor shaft
45 longitudinal axis
46 gearbox
48 high speed shaft
50 coupling
52 support
54 support
56 yaw drive mechanism
58 meteorological mast
60 forward support bearing
62 shaft support bearing
64 drive train
66 pitch assembly
68 pitch drive system
70 sensor
72 pitch bearing
74 pitch drive motor
76 pitch drive gearbox
78 pitch drive pinion
80 overspeed control system
82 cables
84 power generator
86 cavity
88 inner surface
90 outer surface
100 current power generation
102 prediction period
104 predicted power generation
106 wind direction forecast information
107 current wind direction
108 wind speed forecast information
109 current wind speed
110 first predicted energy loss
112 possible early untwist operation
114 second predicted energy loss
116 second possible untwist operation
118 twist angle threshold
118a low twist angle threshold
118b high twist angle threshold
120 maximum twist angle threshold
122 current twist angle
124 predicted twist angle
126 power generation threshold
128 wind speed threshold
150 idle mode
152 operational mode with low power generation
154 operational mode with high power generation
156 further measures
200-210 steps
t1 first specific time
t2 second specific time
$P_R$ rated power

The invention claimed is:

1. A method for operating a wind turbine having a nacelle being rotatably supported about a vertical yaw axis on a tower of the wind turbine, wherein at least one tower cable is provided between the nacelle and the tower, comprising:
  initiating an early untwist operation for untwisting the tower cable at a first specific time:
  predicting a future power generation of the wind turbine for a certain prediction period by analyzing a prediction of the wind;
  wherein the first specific time is determined such that an overall predicted energy generation of the wind turbine over the certain prediction period is maximized, or that a predicted energy loss caused by the early untwist operation is minimized.

2. The method according to claim 1, wherein the first specific time is determined such that a first predicted energy loss caused by the early untwist operation initiated at the first specific time is less than a second predicted energy loss caused by a possible untwist operation which would be performed at a second specific time.

3. A method for operating a wind turbine having a nacelle being rotatably supported about a vertical yaw axis on a tower of the wind turbine, wherein at least one tower cable is provided between nacelle and the tower, comprising:
  initiating an early untwist operation for untwisting the tower cable at a twist angle threshold of the nacelle, wherein the twist angle threshold is smaller than a maximum twist angle threshold, and if a first condition is fulfilled;
  wherein the early untwist operation is initiated also upon fulfillment of a first condition, the first condition being that a current power generation or a predicted power generation of the wind turbine is less than a specific power generation threshold of the wind turbine, or if a current wind speed or a predicted wind speed is less than a wind speed threshold.

4. The method according to claim 3, comprising predicting the predicted power generation of the wind turbine for a certain prediction period by analyzing a prediction of the wind, including one or both of wind direction forecast information and wind speed forecast information.

5. The method according to claim 4, wherein the early untwist operation is initiated only if a second condition is also fulfilled, the second condition being that the current power generation is less than the predicted power generation, or a current wind speed is less than a predicted wind speed.

6. The method for operating a wind turbine having a nacelle being rotatably supported about a vertical yaw axis on a tower of the wind turbine, wherein at least one tower cable is provided between the nacelle and the tower, comprising:
  initiating an early untwist operation for untwisting the tower cable when a current twist angle of the nacelle exceeds a twist angle threshold, wherein the twist angle threshold is smaller than a maximum twist angle threshold; and
  wherein the twist angle threshold is dependent on a current power generation of the wind turbine such that the twist angle threshold increases or at least remains constant with an increasing current power generation of the wind turbine.

7. The method according to claim 6, comprising predicting a predicted twist angle of the tower cable for a certain prediction period by analyzing a prediction of the wind, including one or both of wind direction forecast information and wind speed forecast information.

8. The method according to claim 7, wherein the predicting of the predicted twist angle takes into consideration an execution of at least one untwist operation.

9. The method according to claim 7, wherein the certain prediction period is at least as long as an untwist time period required for an untwist operation of about 360°.

10. The method according to claim 7, wherein the certain prediction period is at least as long as the predicted twist angle having reached the maximum twist angle threshold, including time for executing an untwist operation.

11. The method according to claim 6, wherein duration of the untwist operation or a number of rotations of the untwist operation is determined such that an overall predicted energy generation of the wind turbine over a certain prediction period is maximized.

12. The method according to claim 6, wherein a number of untwisting rotations of the nacelle during the untwist operation is less than a number of necessary rotations for bringing the nacelle into a rotational position of less than 360° with respect to the tower, or wherein the untwist operation comprises less than three rotations of the nacelle.

13. The method according to claim 6, comprising automatically providing a control request for executing the early untwist operation to a control center of the wind turbine.

14. A wind turbine system, comprising:
a wind turbine, wherein the wind turbine comprises a tower, a nacelle rotatably supported about a vertical yaw axis on the tower, a tower cable provided between the nacelle and the tower, a yaw drive mechanism for rotation of the nacelle around the yaw axis, a rotor rotatably supported by the nacelle;
a control system integrated in the wind turbine or at an external control arrangement, wherein the control system is configured to operate the wind turbine in accordance with the method of claim 1.

* * * * *